(12) United States Patent
McGuire

(10) Patent No.: US 9,909,223 B1
(45) Date of Patent: Mar. 6, 2018

(54) EXPANDED METAL WITH UNIFIED MARGINS AND APPLICATIONS THEREOF

(71) Applicant: Byron Duvon McGuire, Underwood, IN (US)

(72) Inventor: Byron Duvon McGuire, Underwood, IN (US)

( * ) Notice: Subject to any disclaimer, the term of this patent is extended or adjusted under 35 U.S.C. 154(b) by 0 days.

(21) Appl. No.: 15/261,241

(22) Filed: Sep. 9, 2016

Related U.S. Application Data

(62) Division of application No. 14/450,577, filed on Aug. 4, 2014, now abandoned.

(51) Int. Cl.
| | |
|---|---|
| C25B 15/08 | (2006.01) |
| C25B 9/04 | (2006.01) |
| C25B 9/08 | (2006.01) |
| C25B 11/03 | (2006.01) |

(52) U.S. Cl.
CPC .............. *C25B 9/04* (2013.01); *C25B 9/08* (2013.01); *C25B 11/03* (2013.01); *C25B 15/08* (2013.01)

(58) Field of Classification Search
CPC .. C25B 9/04; C25B 11/03; C25B 9/08; C25B 15/08
See application file for complete search history.

(56) References Cited

U.S. PATENT DOCUMENTS

| | | | |
|---|---|---|---|
| 1,101,078 A | 6/1914 | Kiefer | |
| 1,561,272 A | 11/1925 | Nagel | |
| 3,165,810 A | * 1/1965 | Agler | B21D 31/043 29/6.2 |
| 4,142,950 A | 3/1979 | Creamer et al. | |
| 4,210,501 A | 7/1980 | Dempsey et al. | |
| 4,247,376 A | 1/1981 | Dempsey et al. | |
| 4,248,681 A | 2/1981 | Sweeney | |
| 4,250,126 A | 2/1981 | Yates | |
| 4,334,968 A | 6/1982 | Sweeney | |
| 4,374,711 A | 2/1983 | Ogawa | |
| 4,374,712 A | 2/1983 | Gray | |
| 4,426,261 A | 1/1984 | Fushihara | |
| 4,436,608 A | 3/1984 | Bennett et al. | |
| 4,555,323 A | 11/1985 | Collier et al. | |
| 4,613,415 A | 9/1986 | Wreath et al. | |
| 4,683,040 A | 7/1987 | Seko | |
| 4,744,877 A | 5/1988 | Maddock | |
| 4,769,137 A | 9/1988 | Powell, Jr. | |
| 4,793,909 A | 12/1988 | Maddock | |
| 4,997,540 A | 3/1991 | Howlett | |

(Continued)

FOREIGN PATENT DOCUMENTS

GB         254268 A  *  9/1927  .............. C25B 9/04

*Primary Examiner* — Jason L Vaughan
*Assistant Examiner* — Amanda Meneghini
(74) *Attorney, Agent, or Firm* — Wyatt, Tarrant & Combs, LLP; Stephen C. Hall

(57) ABSTRACT

Provided are methods for producing expanded metal structures with solid margin separated by aperture regions, and applications thereof. The solid and aperture regions are formed by controlling the actuation of the punch sequence, including by the use of actuated and non-actuated regions along the metal sheet. By way of non-limiting examples, the solid margins facilitate uniform connections to form electrodes, e.g., for use in an electrolytic cell for a water purification system, or electrochemical processes in general, and they facilitate indexing of the expanded metal for downstream processing.

7 Claims, 10 Drawing Sheets

(56) References Cited

U.S. PATENT DOCUMENTS

| | | | |
|---|---|---|---|
| 5,094,734 | A | 3/1992 | Torrado |
| 5,114,547 | A | 5/1992 | Ullman |
| 5,376,242 | A | 12/1994 | Hayakawa |
| 5,411,641 | A | 5/1995 | Trainham, III et al. |
| 5,458,743 | A | 10/1995 | Allen |
| 5,460,706 | A | 10/1995 | Lisboa |
| 5,565,082 | A | 10/1996 | Nakamatsu et al. |
| 5,650,058 | A | 7/1997 | Wenske et al. |
| 5,693,202 | A | 12/1997 | Gestermann et al. |
| 5,798,036 | A | 8/1998 | Zimmerman et al. |
| 6,368,472 | B1 * | 4/2002 | McGuire ............ C02F 1/46104 204/252 |
| 8,146,218 | B1 | 4/2012 | Ealer, Sr. et al. |
| 2004/0157105 | A1 | 8/2004 | Ovshinsky et al. |
| 2006/0193758 | A1 | 8/2006 | Nam et al. |
| 2010/0195120 | A1 | 8/2010 | Kadokura |

\* cited by examiner

EXPANDED METAL WITH UNIFIED MARGINS AND APPLICATIONS THEREOF

RELATED APPLICATIONS AND/OR CLAIM OF PRIORITY

This Divisional Patent Application claims priority to and benefit from, currently pending, U.S. patent application Ser. No. 14/450,577, filed on Aug. 4, 2014, which is hereby incorporated by reference.

FIELD OF INVENTION

The subject embodiments relate to expanded metal, particularly relating to methods of making expanded having unified solid margins and a range of structures capable of assembly from said method. In particular, the embodiments relate to the use of expanded metal having unified solid margins in structures and systems that utilize the conductance of electricity in the presence of an electrolyte or an electric field.

BACKGROUND

The current method of making expanded metal begins with feeding sheet metal into a press that has a roller system to move the sheet metal in a direction parallel to the plane of the sheet metal. Often, the sheet metal is fed until it reaches a descending edge such that the sheet metal is partially overhanging the descending edge. Simultaneously, a punch descends in a direction substantially perpendicular to the plane of the sheet metal and contacts the sheet metal near the descending edge. The punch is fitted with a plurality of triangular-shaped bits that result in triangular-shaped voids following the actuation of the punch, which shears and expands the metal. On each subsequent actuation of the punch, the punch moves transversely prior to descending such that subsequent actuations of the punch result in similar triangular-shaped voids, thus creating a diamond-shaped interconnected mesh. The current method of making expanded metal has many shortcomings that present themselves in a difficulty to consistently control pattern layout in smaller parts made from expanded metal. These deficiencies give rise to difficulty in using expanded metal in mass manufacturing processes such as injection molding, indexing, precision attachment, and others.

Commonly, expanded metal sheets are used as an anode and/or a cathode in an electrolytic cell that is used to generate chemicals from liquid solutions. Often, the electrolytic cell is used as part of a larger water treatment or chemical system that further comprises a cathode chamber and an anode chamber, wherein one end of each the anode and the cathode are external to their respective chambers and are electrically coupled to a power source, e.g., a battery or other electrical power source known to the art. In some embodiments, each chamber contains an electrolyte, i.e., matter through which electricity is capable of being conducted. Commonly, the electrolyte is either a liquid, solid, or a gel. Further, an electrode-chamber-separating element may be disposed between the anode and the cathode, and their respective chambers. Herein, when the terms are used in the context of an electrolytic cell, cathode refers to a negative terminal, and anode refers to a positive terminal.

Accordingly, the end of the expanded metal sheet that is external to the liquid holding chamber (e.g. the anode chamber) is sealed to prevent leakage of the liquid and damage of the electrical connection that electrically couples the expanded metal sheet to the power source. The current methods of sealing the expanded metal sheet include the placement of a forming gasket or the like, often by hand. The current methods are labor intensive, imprecise, and sometimes ineffective, thus the electrolytic cell is not suitable for mass production.

Further difficulties reside with the current attachment method of the electrical connection to the expanded metal sheet. Current methods include placing the electrical connection in contact with the expanded metal sheet and tightening a screw-and-nut configuration to fix the electrical connection in place. This method is deficient in that the electrical connection can loosen over time and the attachment process is labor intensive. Further, this method is not conducive to even electric current distribution across the expanded metal sheet, such as needed in active control of quantum level directed reactions.

Consequently, metal manufacturers and electrolytic cell manufacturers are in need of a more precise, consistent method of manufacturing expanded metal such that it can be used in mass manufacturing processes. Moreover, electrolytic cell manufacturers are in need of an improved method for sealing expanded metal in a liquid holding chamber. Further still, electrolytic cell manufacturers are in need of an improved method for fixing electrical connections to expanded metal that is less laborious and more robust. The manufacturing limitations, labor-intensive processes, and lack of manufacturability have made expanded metal manufacturing and electrolytic cell manufacturing time consuming, laborious processes that are not suitable for mass production. Consequently, an expanded metal manufacturing method that reduces labor and further improves electrolytic cell manufacturing is desirable for metal manufacturers and electrolytic cell manufacturers.

SUMMARY OF EMBODIMENTS

The embodiments described herein meet the objectives stated in the previous section, and provide a method for producing expanded metal with unified solid margins on either side of the aperture regions. The aperture regions of expanded metal comprise voids that form an interconnected web, which forms the outline of said voids. Each edge of the interconnected web in the direction of feed for the punch is fully connected to a solid margin such that the aperture region and both solid margins form a unified body. To accomplish this unified body, the typical method of production is modified to allow for the prevention of actuating the punch over the solid margin of the sheet metal, thus the feed of the sheet metal continues as the actuation of the punch is prevented.

The embodiments further aim to provide for the scalability of the size of both the aperture region and the solid margin. The improved method of producing expanded metal described above further allows for the adjustment of the associated dimensions of the expanded metal with unified solid margins. The width of both the aperture region and each solid margin are selectively adjustable to produce varied sizes of expanded metal such that the size of the finished expanded metal sheet is produced at the proper size for specific applications, such as different size electrolytic cells. The size of expanded metal is adjusted by separately adjusting the feed rate and the punch actuation of the press.

A further aim is to provide an improved capability for indexing expanded metal to allow for downstream processing. Indexing of an expanded metal sheet provides a location feature to facilitate further manufacturing and assembly processes. In the case of expanded metal with unified solid margins, an indexing feature is added to at least one solid margin to provide location in machinery used in downstream processes. Due to the nature of common expanded metal that consists solely of aperture region, an indexing feature cannot be added with the necessary precision or without damaging the integrity of the structure. One example of a downstream process that requires indexing is injection molding, particularly overmolding of plastic onto the expanded metal substrate.

A further aim of the embodiments is to provide improved capability for mounting expanded metal in an assembly, such as an electrolytic cell. Current expanded metal does not provide a proper mounting interface without labor-intensive, costly processes. The solid margin of expanded metal with a unified solid margin provides a suitable interface for mounting. The solid margin further provides the proper geometry to incorporate further mounting features, such as through-holes for bolts or rivets and sealing.

A further aim is to provide improved electrical conductivity properties of the expanded metal in the case that the expanded metal is used as part of an electrode. The solid margin according to multiple embodiments and alternatives provides for improved electrical connections to the power source by allowing for more permanent methods of fixing said electrical connections to the expanded metal. The unified solid margin of the embodiments further provides for improved electrical current distribution over the expanded metal. The geometry of the expanded metal with unified solid margins provides for better electrical connection and more uniform electrical current distribution, such that hot or cold spots are prevented.

The subject embodiments also aim to provide for the implementation of downstream addition of structural components to the expanded metal with unified solid margins to facilitate the accomplishment of assembly functions while eliminating certain other components of the assembly. Specifically, adding assembly features to the expanded metal with unified solid margins by utilizing overmolding capabilities of injection molding allows for the elimination of the components currently used to accomplish said feature of the assembly. In particular, the geometry of the solid margins is altered through the addition of structural components, e.g., overmolded plastic or elastomeric materials, to seal a portion of the expanded metal sheet in an electrolytic cell assembly.

Accordingly several advantages are to provide a method for producing expanded metal with unified solid margins, to provide improved scalability of expanded metal with unified solid margins, to provide indexing capability for indexing expanded metal, to provide an improved capability for mounting expanded metal in an assembly, to provide improved electrical conductivity properties of expanded metal, and to provide integrated geometries for assembly and subassembly processes. Still further advantages will become apparent from a study of the following descriptions and the accompanying drawings.

BRIEF DESCRIPTION OF THE DRAWINGS

The drawings and embodiments described herein are illustrative of multiple alternative structures, aspects, and features of the embodiments described and claimed herein, and they are not to be understood as limiting the scope of the embodiments. It will be further understood that the drawing figures described and provided herein are not to scale, and that the embodiments are not limited to the precise arrangements and instrumentalities shown.

MULTIPLE EMBODIMENTS AND ALTERNATIVES

According to multiple embodiments and alternatives herein, expanded metal with unified solid margins and applications thereof shall be discussed in the present section.

A plurality of embodiments comprises expanded metal with unified solid margins and associated methods of producing. Expanded metal with unified solid margins further comprise various structures, methods, and steps.

Figure 1:
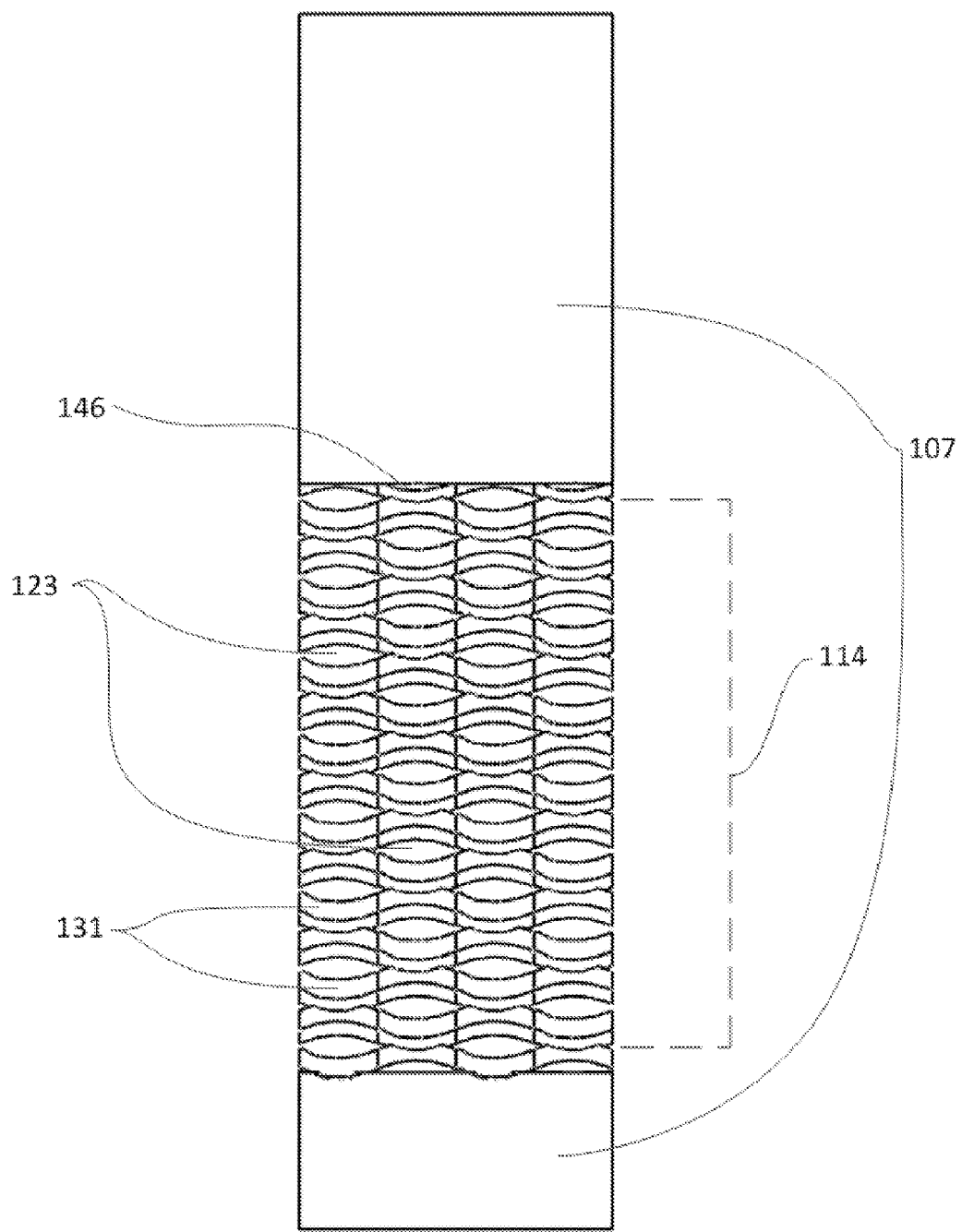
FIG. 1 is a plan view of an expanded metal sheet with unified solid margins, the expanded metal providing an interconnected web forming borders of the voids in the sheet, according to multiple embodiments and alternatives.

FIG. 1 shows an expanded metal sheet having unified solid margins 107 that are located on either side of the aperture region 114. The aperture region 114 comprises a plurality of voids 123 that form an interconnected web 131 of metal, wherein the interconnected web 131 forms borders of said voids 123. The shape and size of each void 123 is determined by the shape and size of each punch bit used as part of the method of producing expanded metal. A void 123 formed through the full thickness of the sheet is referred to herein as an aperture. As shown in FIG. 1, the plurality of voids 123 comprises a substantially uniform shape and size throughout the aperture region 114. Optionally, the plurality of voids comprises substantially varied shape and/or size that are specific to the downstream application.

Still referring to FIG. 1, the plurality of voids 123 often comprise uniform size, diamond-shaped voids that are produced by a corresponding triangular punch bit, which is actuated with alternating transverse movement relative to the plane of the sheet (i.e. transverse in moving back-and-forth from left to right perpendicular to the direction of feed). Optionally, the alternating transverse movement operates in a manner such that the punch bits location alternates between two substantially consistent positions that are transverse in the direction perpendicular to the feed direction of the press. Additionally, the majority of voids that form the aperture region are formed by causing the bits to contact the sheet with sufficient force to penetrate through the full thickness of the metal. Although the needed force will vary based on the type of material, sufficient values are calculable through methods known to those having ordinary skill in the art. Correspondingly, the interconnected web 131 that forms borders of the plurality of voids 123 is provided without breaks or disconnections, such that each section of the interconnected web 131 is conductively coupled to each other section of the interconnected web 131 and the unified solid margins 107.

Again referring to FIG. 1, a unified solid margin 107 is comprised on either side of the aperture region 114 in the direction of feed of the press, such that the unified solid margin 107 is formed by preventing actuation of the punch bits while continuing feed of the metal through the press. Further, the sections of the interconnected web 131 substantially adjacent to each unified solid margin 107 terminate in a manner that connects each section of the interconnected web 131 to at least one unified solid margin 107. Accordingly, the interconnected web 131 of the aperture region 114 and the solid margins 107 form a unified body that does not require independent conjoined mechanical connections.

Further still, as shown in FIG. 1, in some embodiments, the unified solid margins 107 and the aperture region 114 are substantially co-planar, such that the extent of the expanded metal with unified solid margins is markedly flat. Accordingly, the unified solid margins 107 provide a large area of solid metal to support features and properties suitable for downstream processing. Some advantageous features and properties of the unified solid margins 107 are sufficient area for indexing holes, area suitable for mounting features, highly-conductive, large contact areas for electrical current transfer, sufficient surface area for sealing (e.g. shut-off surfaces for injection mold tooling), and combinations thereof. Consequently, the features and properties of the unified solid margins 107 present numerous advantages of expanded metal with unified solid margins for use in various applications; including electrodes in an electrolytic cell.

As FIG. 1 additionally illustrates, a transition region 146 from the aperture region 114 to the unified solid margin 107, and thus adjacent the solid margin, comprises a single actuation of the punch bits through the full thickness of the metal creating a plurality of half-diamond voids, which is followed by an additional transverse actuation of the punch bits that partially penetrates the metal. This partial penetration of the metal forms half-diamond shaped indentations in the transition 146 from the aperture region 114 to the unified solid margins 107, subsequent rows are punched and the stretching and expanding substantially completes the diamond pattern.

Figure 2:
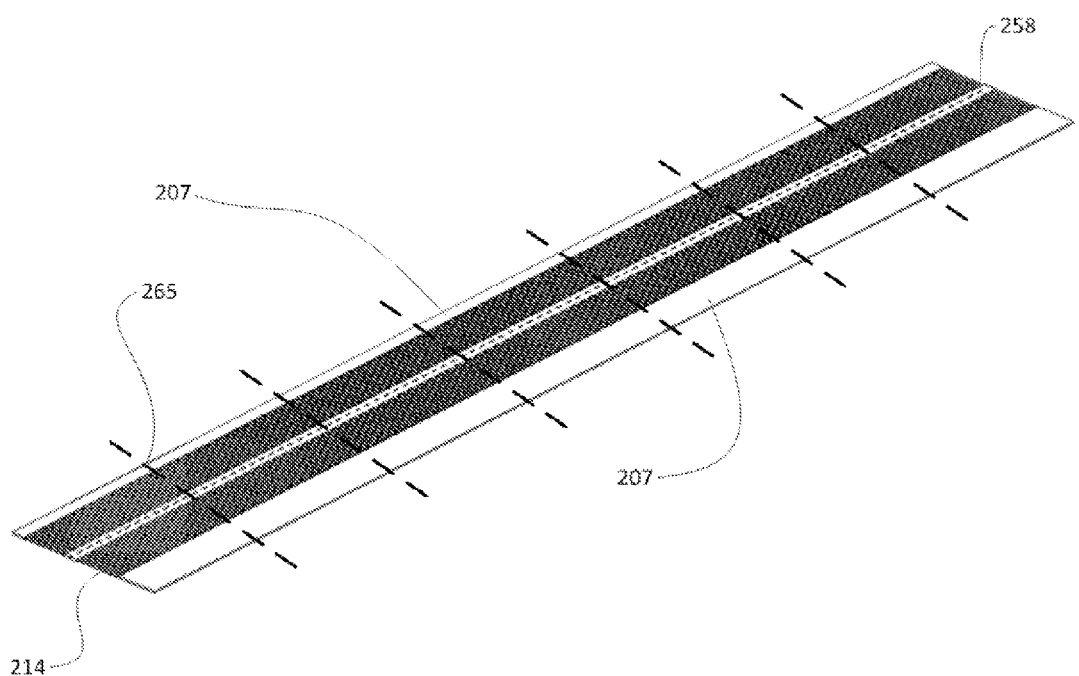
FIG. 2 is a perspective view of a full expanded metal sheet with solid margins prior to size processing, according to multiple embodiments and alternatives.

FIG. 2 illustrates a larger expanded metal sheet with solid margins 207 separating multiple aperture regions 214 arranged in deliberate sizes determined by the settings of the press. The larger expanded metal sheet represents the geometry of the metal sheet following processing by the press. Consequently, the larger expanded metal sheet is divided into multiple smaller pieces of expanded metal with unified solid margins 207, as described by FIG. 1.

Still referring to FIG. 2, a score row 258 extends throughout the interior of each solid margin 207, substantially in the direction of the longer length of the solid margin 207. The score row 258 is formed by at least one partial depth actuation of the punch bits such that the punch bits do not penetrate throughout the full thickness of the metal. Optionally, an additional partial depth punch is actuated following transverse movement of the punch bits and without forward feed movement of the metal sheet through the press. Thus, a uniform score row 258 is formed in the solid margin 207 providing a location for separating the larger expanded metal sheet in further processes. Further, the score row 258 facilitates less labor-intensive and more precise separation of the larger expanded metal sheet into pieces of expanded metal with unified solid margins Again referring to FIG. 2, the division line 265 that is substantially perpendicular to the score row 258 represents the adjustable location that the larger expanded metal sheet can be divided to fit specific applications. The division line 265 is indicative of one example location of where the larger expanded metal sheet can be cut or sheared by a process secondary to the press to size the expanded metal with unified solid margins for a specific application, such as an electrode in an electrolytic cell.

Accordingly, the expanded metal with unified solid margins may be composed of various metal materials. For example, the expanded metal with unified solid margins may be composed of titanium, stainless steel, nickel, chrome, copper, and other transition metals and alloys. Further, in some embodiments, the expanded metal with unified solid margins may comprise a coating that is specific to the application of the piece. For example, in the case of an electrode, a catalytic coating may be applied to protect the substrate from corrosion and conductivity degradation. Optionally, the catalytic coating is chosen from the group consisting of transition metals, transition metal oxides, noble metals, noble metal oxides, titanium oxides, and any combination thereof. Some examples of transition metals may include zirconium, niobium, silver, and hafnium. Further, some examples of noble metals may include platinum, tantalum, rhodium, iridium, ruthenium, and gold. Additionally, some examples of noble metal oxides include iridium oxides and ruthenium oxides. Further still, these metals and oxides may also be combined with tin metal. The catalytic coating is applied to the electrode through methods known to persons skilled in the art.

Figure 3:
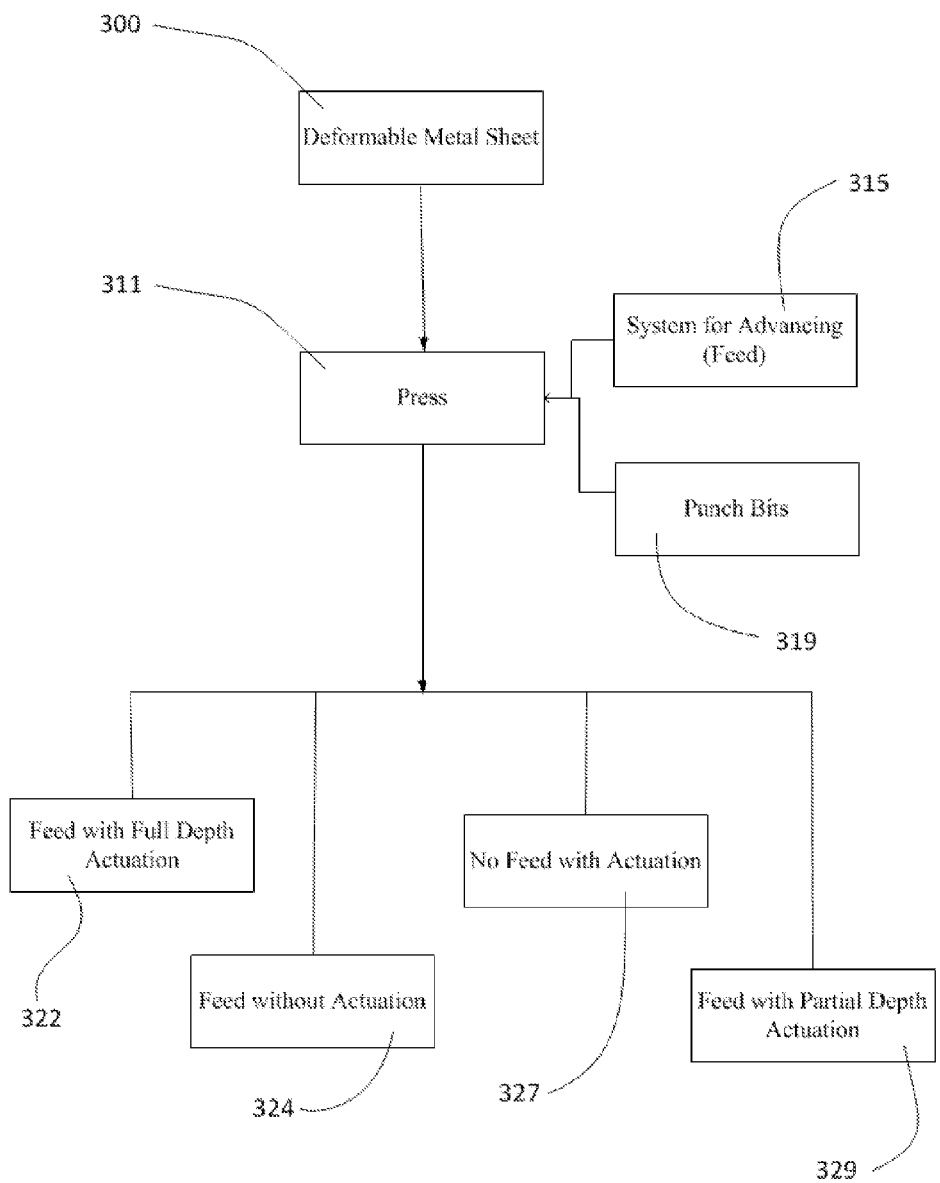
FIG. 3 is a flow chart of the method of producing expanded metal with unified solid margins, according to multiple embodiments and alternatives.

Referring now to FIG. 3, a method of producing expanded metal with unified solid margins is described. A deformable metal sheet 300 is fed into a press 311 that comprises a system for advancing 315 the metal sheet through the press and a plurality of punch bits 319 that actuate in the direction substantially perpendicular to the plane of the metal sheet 300. Various settings of the press 311 are adjusted to create the desired size and shape of the metal sheet 300 after passing through the press 311. In some embodiments, at least four operation modes of the press are interchangeably selected at various stages of the metal sheet passing through the press. Optionally, four operation modes of the press include feed with full depth actuation 322, feed without actuation 324, no feed with actuation 327, and feed with partial depth actuation 329.

Again referring to FIG. 3, the feed with full depth actuation 322 operation mode comprises progressing 315 the metal sheet 300 through press 311 at a constant feed rate and simultaneously actuating the punch bits 319 at a corresponding rate to the feed rate, wherein the punch bits 319 contact the metal sheet 300 under sufficient force to form a void in the plane of the metal sheet 300. The feed with actuation 322 operation mode primarily serves the function of forming the aperture region of the expanded metal with unified solid margins.

Still referring to FIG. 3, the feed without actuation 324 operation mode comprises feeding 315 the metal sheet 300 though the press 311 at a certain feed rate and simultaneously preventing the actuation of the punch bits 319, thus no void is formed in the metal sheet 300. The operation mode primarily serves the function of producing the solid margin of the expanded metal sheet with unified solid margins.

Continuing to refer to FIG. 3, the no feed with actuation 327 operation mode comprises preventing the forward feed 315 of the metal sheet through the press 311 and simultaneously actuating the punch bits 319 to a partial depth punch or a full depth punch. A partial depth punch in this operation mode is consistent with the method for creating the score row 258 as discussed in reference to FIG. 2. This operation is often performed after the feed without actuation 324 operation mode and again followed by the feed without actuation 324 operation mode. This sequence of operation modes serves to create the score row 258 within the solid margin 207 such that later divided parts comprise unified solid margins.

Referring again to FIG. 3, the feed with partial depth actuation 329 operation mode comprises feeding 315 the metal sheet 300 through the press 311 at a certain feed rate and actuation of the punch bits 319 at an actuation rate to a partial depth such that indentations consistent with the shape of the punch bits 319 are formed, as opposed to voids. This operation mode primarily serves the function of providing a transition between an aperture region and a solid margin.

Optionally, in some embodiments, the punch bits 319 move transversely between each actuation such that the punch bits 319 operate in a side-to-side motion as well as an up-and-down motion. Additionally, the punch bits 319 move transversely between two substantially consistent transverse positions to provide a consistent punch pattern. Consequently, the two transverse positions of the punch bits 319 are related to the size and shape of each individual punch bit. For example, the distance between the transverse positions of the punch bits 319 is consistent with the width of an individual punch bit plus a desired web width.

Additionally, the overall size and shape of the expanded metal with unified solid margins may be efficiently and precisely adjusted by modifying the sequence of the operation modes of the press. For example, the aperture area size is increased by increasing the duration of the feed with full depth actuation 322 operation mode and decreasing the feed without actuation 324 operation mode. As discussed previously, the transverse distance the punch bits transversely move may be adjusted to modify the shape of the aperture region.

Accordingly, further processing steps are performed to obtain the proper size expanded metal with unified solid margins for a specific application. Further processing steps may include cutting or shearing the metal sheet and/or separating the metal sheet along the scored row generated by the press Still further processing steps are possible for desired applications.

Figure 4:
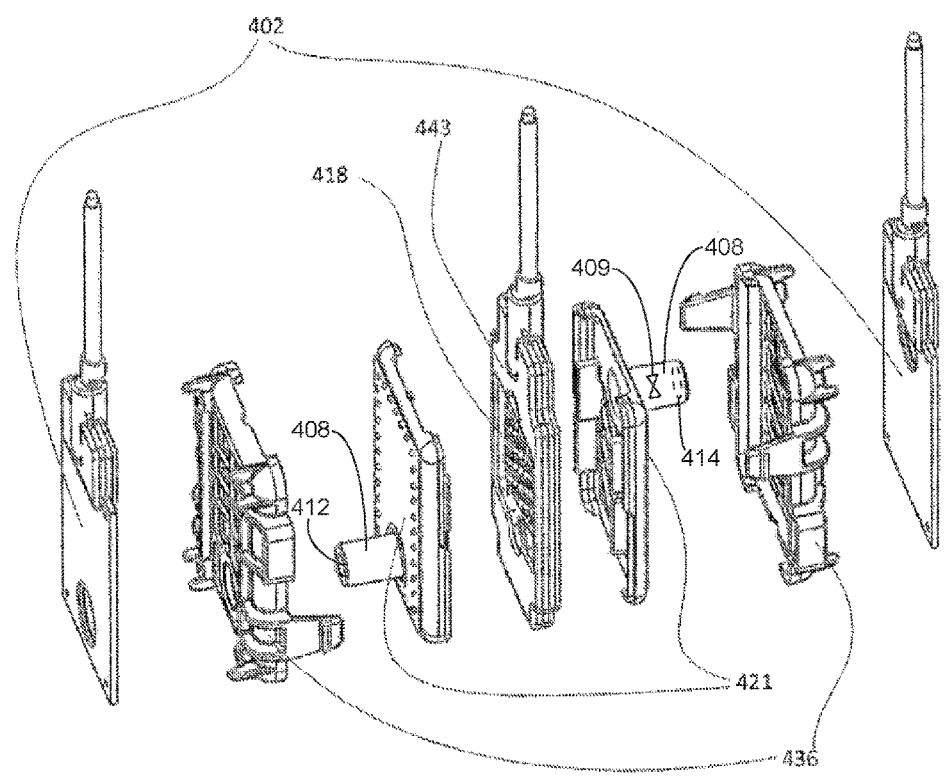
FIG. 4 is an exploded view of an electrolytic chemical generator comprising an electrolytic cell, according to multiple embodiments and alternatives.

As shown in FIG. 4, one such application is an electrolytic chemical generator, wherein the expanded metal with unified solid margins serves as at least one electrode. An electrolytic chemical generator is used for generating chemicals, including a variety of organic compounds, and inorganics such as chlorine and ozone. Optionally, the electrolytic chemical generator is used for treating water as part of a water purification system. Accordingly, in some embodiments, the electrolytic chemical generator comprises an electrolytic cell having at least two electrodes, including at least one cathode 402 and at least one anode 418 occupying separate chambers, at least one membrane 421 (i.e., positioned between the anode chamber and the cathode chamber) and at least one outer housing (not shown) for each chamber defining a boundary of the chamber In some embodiments, an intermediate housing 436 secures membranes 421 to their respective anode chambers. In some embodiments, the membrane 421 composed of an interwoven mesh material with openings that are of appropriate size to separate cations and anions, e.g., allowing sodium ions to pass while restricting passage of chloride ions. Liquid is contained within the electrolytic cell such that at least a portion of electrodes 402, 418 is in contact with the liquid. Further, an electric current is passed through the electrodes 402, 418 while in contact with the liquid in order to generate certain chemical byproducts from the present liquid.

As FIG. 4 illustrates, in some embodiments, one anode 418 is positioned between two cathodes, each labeled as 402. In such configuration, an anode comprises a first anode surface and an opposing second anode surface (opposite the first anode surface), and may be positioned such that the first anode surface is oriented primarily toward one of the cathode, and the second anode surface is oriented primarily toward the other cathode. Among other benefits, such a configuration promotes efficiency by allowing both surfaces of the anode to be involved in electrolytic chemical generation. However, other options and alternatives exist, and the claimed embodiments are not limited by how many electrodes are utilized, or by whether the number of cathodes exceeds the number of anodes, or vice versa, or whether the number of each type of electrode is equal.

Again referring to FIG. 4, consequently, the portion of the electrode contacting liquid must be sealed off from the portion of the electrode with the electrical connection. Current methods include placing two gaskets (not shown) on either side of the electrode, such that the gasket is compressed between the electrode and a flange on one side and between the electrode and the electrode-chamber-separating element on the other side. Often, the gaskets are composed of rubber or another pliable material. Accordingly, the embodiments herein provide improved methods for sealing off the two portions of the electrode that include at least one overmolded component 443.

In some embodiments, the electrolytic chemical generator further comprises electrolytic chambers, a power supply, and a conduit 408 which can be a water line having an inlet 412 and outlet 414. The electrolytic chambers are the anode chamber and the cathode chamber. In a water treatment operation, the anode chamber(s) and the cathode chamber(s) are filled with water through any of a number of means known in the art, e.g., gravity fed or flow produced under a vacuum. A salt of chloride is then added to the anode chamber, for example sodium chloride or potassium chloride. The power supply is then connected to electrodes 402, 418. Flow is then started between the anode chamber and the water line until sufficient suction is created. The power supply is then powered and electrolysis begins. During electrolysis, chlorine gas, ozone, and other mixed oxidants are liberated at the anode and bubble to the surface of the anode chamber, where gaseous matter is then introduced (e.g., through a gas release valve 409 in communication with the water line or by injection) into the water line to treat the water. Sodium hydroxide forms in the cathode chamber during this process. Accordingly, expanded metal with unified solid margins may be used for the anode and/or the cathode of the electrolytic chemical generator.

Figure 5:
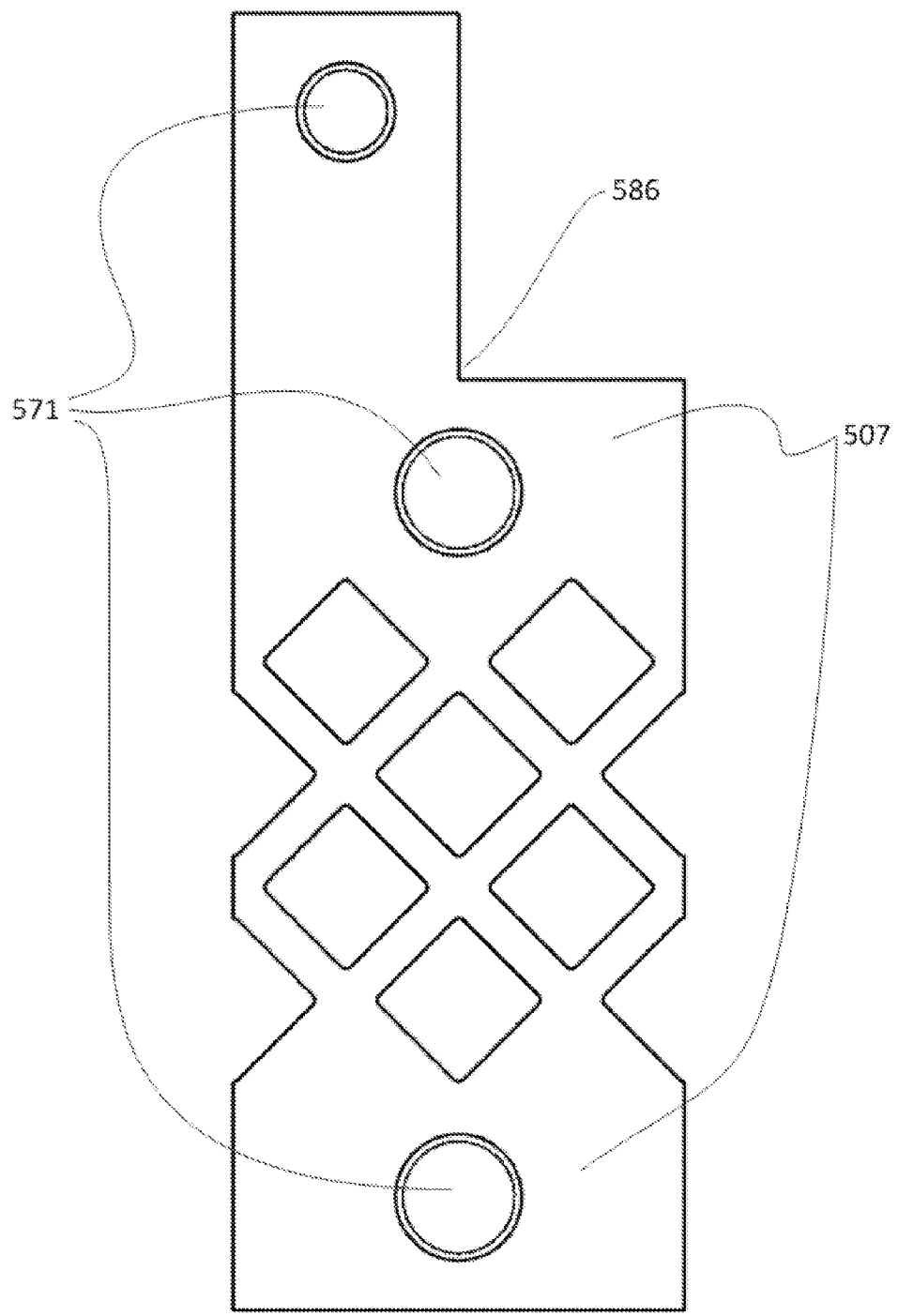
FIG. 5 is a plan view of an expanded metal sheet with unified solid margins comprising at least one indexing hole, according to multiple embodiments and alternatives.

Referring now to FIG. 5, the expanded metal with unified solid margins 507 further comprises at least one indexing feature formed in the solid margin 507 that provides location and retention functionalities to the expanded metal sheet for downstream processing. Optionally, the indexing feature (also referred to herein as an indexing sub-structure) is a through hole 571 or notch 586 in the solid margin 507 that is formed by punching through the full thickness of the metal sheet to form an opening.

Additionally, the geometry of the indexing feature may provide further orientation functionalities by comprising a geometry that does not allow for mating geometry to pass through the indexing feature unless it is in a specific orientation. For example, the indexing feature is a through hole comprising 5 distinct sides where a first 2 adjacent sides are similar lengths and a second 2 adjacent sides are similar lengths but the mating corner of the second 2 adjacent sides is truncated with a fifth side, thus forming a rectangular-like shape with one corner truncated at a pre-selected angle as desired.

Again referring to FIG. 5, the orientation functionality of the indexing feature is accomplished by the position of the indexing feature within the solid margin 507. Optionally, the indexing feature is located substantially closer to one edge of the solid margin 507 in one direction than to the other edge of the solid margin 507. This provides for the correct orientation with respect to one planar direction. Additionally, the indexing feature is again located substantially closer to one edge of the solid margin 507 in the second direction than to the other edge of the solid margin 507 in that same second direction. This provides further orientation limitation in a second planar direction. Commonly, the downstream process fixes the expanded metal under compression for processing, thus limiting movement of the expanded metal with unified solid margins in a third coordinate direction perpendicular to the plane. Optionally, the downstream process comprises placing the expanded metal in a corresponding cavity in the tool. Placement in the cavity limits the movement of the expanded metal in relation to pitch, yaw, and roll. Accordingly, the utilization of the indexing feature that is formed in the solid margin 507 of the expanded metal within downstream processes that employ compression and cavitated tooling provides for secondary manufacturing processes to be performed on the expanded metal with improved consistency and precision.

Figure 6:
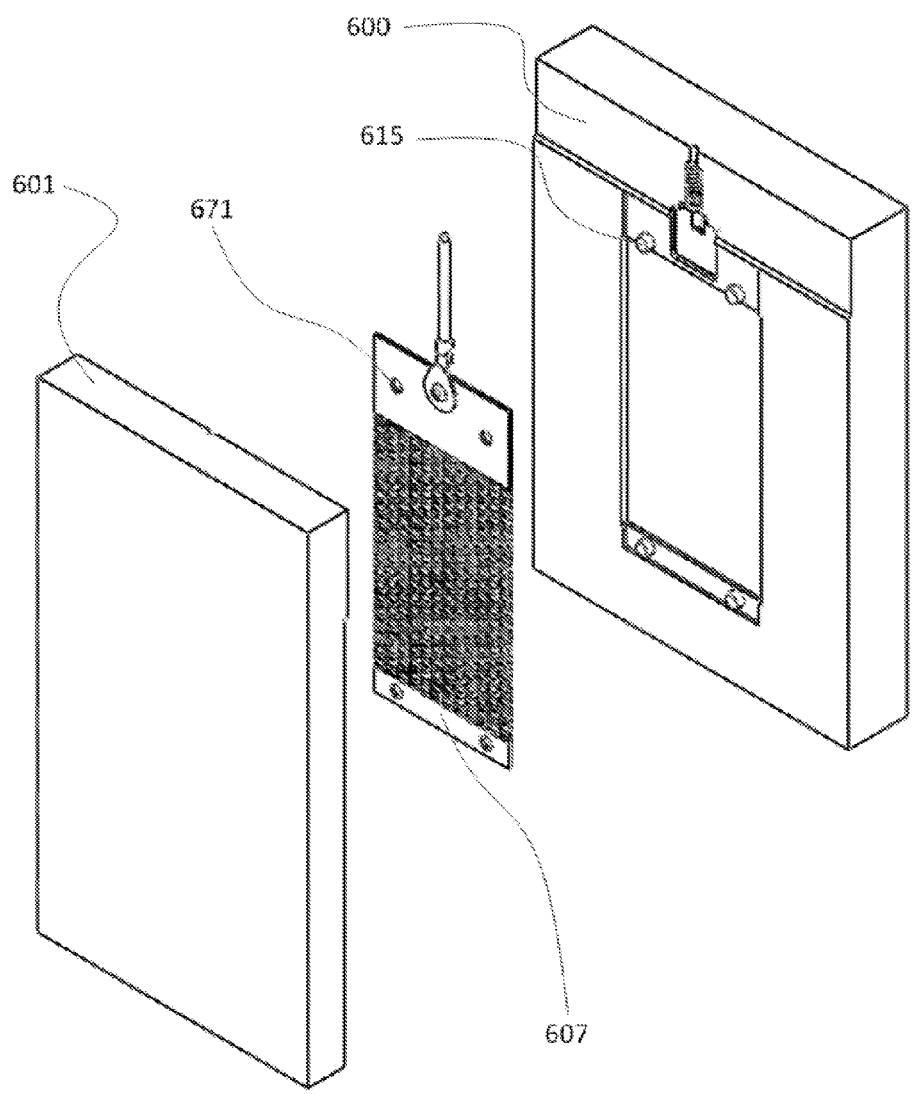
FIG. 6 is a system diagram of an expanded metal sheet with unified solid margins arranged for placement in an injection molding machine for overmolding plastic, according to multiple embodiments and alternatives.

One such downstream process, as illustrated in FIG. 6, is injection molding, specifically overmolding of plastic onto the expanded metal with unified solid margins. An application specific injection molding tool is used having at least two separable sections 600, 601 that comprise cavities, protrusions, pins, and other geometric features that correspond to the desired geometry of the plastic part. Accordingly, the injection molding tool further comprises geometry associated with retaining the expanded metal including forming added structural components onto the expanded metal, wherein the added structure is composed of plastic materials such as, but not limited to, polyethylene, polypropylene, PVDF, PVC, CPVC, and the like. Additionally, the injection molding tool comprises at least one core 615 having a geometry that corresponds to the geometry of the indexing feature 671, wherein the core 615 protrudes from one section 600 of the tool and passes through the indexing feature 671 such that the core 615 is matably inserted in the other section 601 of the tool that is opposite the section 600 from which the core 615 protrudes. The core 615 retains the expanded metal within the tool via the indexing feature 671 and the corresponding cavity formed in the sections of the tool. The injection molding tool is then closed under compression such that the unfilled geometry of the tool will be filled with plastic to form the desired geometry of the finished part.

Molten plastic is then injected under high pressure into the cavity of the tool until the cavity is sufficiently filled. The solid margin 607 of the expanded metal provides an appropriate surface for bonding molten plastic to the substrate material of the expanded metal. The solid margin 607 further provides an adequate shut off surface and features for the injection molding tool. After a certain amount of time, the plastic is cooled and the tool is reopened exposing the finished part, the expanded metal with added plastic geometry. The finished part is then ejected from the tool and another piece of expanded metal may be inserted in the tool for further production. The indexing feature 671 provides for consistency and precision in the injection molding process including the expanded metal with unified solid margins. Lack of inserted part consistency and precision often leads to poor plastic formation and damage to tooling and machinery. The unified solid margins and associated features reduce such risks.

Accordingly, the type of plastic used for the injection molding process including the expanded metal with unified solid margins is chosen based on certain properties of the plastic and the intended application. Examples of intended applications for the plastic may include seal or gasket, mounting structure, and flow routing. Plastic property considerations include application requirements, bonding ability with substrate material (i.e. expanded metal material), corrosion properties, thermal properties, electrical and thermal insulating properties, and still others. The plastic may be composed of a thermoplastic including materials available in the art.

Figure 7:
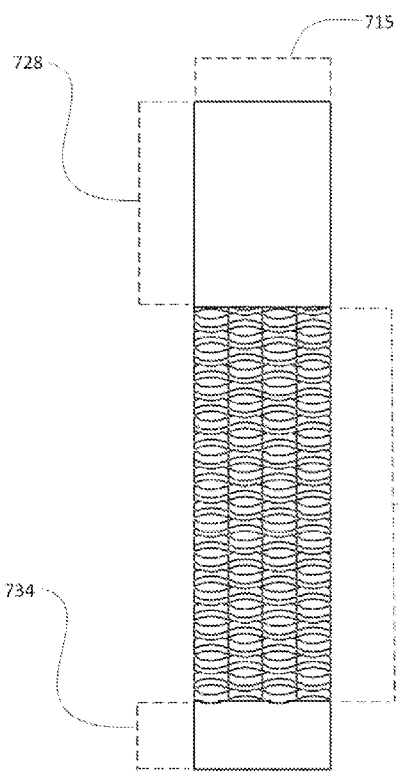
FIG. 7 is a plan view of an expanded metal sheet with unified solid margins showing the scalable dimensions during production, according to multiple embodiments and alternatives.

FIG. 7 illustrates the scalable dimensions an expanded metal sheet with unified solid margins. Dimension 701 is indicative of the width of the aperture region that is adjustably selected as part of the method of production described in FIG. 3. Dimension 701 further partially dictates the amount of contact surface area present in the finished expanded metal sheet with unified solid margins. For example, in the case of the electrolytic chemical generator described in FIG. 4, dimension 701 is adjusted in accordance with the desired amount of chemical generation for the application.

Again referring to FIG. 7, dimension 715 is indicative of the width of the finished expanded metal sheet with unified solid margins that is adjustably selected as part of the method of producing described in FIG. 3. Similarly, dimension 715 partially dictates the amount of contact surface area present in the finished expanded metal sheet with unified solid margins. In the same way, for example, dimension 715 is also adjusted in accordance with the desired amount of chemical generation by the electrolytic chemical generator shown in FIG. 4.

Still referring to FIG. 7, dimension 728 and dimension 734 are indicative of the widths of a first and second solid margin that are adjustably selected as part of the method of production described by FIG. 3. Optionally, dimension 728 and dimension 734 may be of differing widths. For example, dimension 728 and dimension 734 are selectively adjusted in accordance with requirements of secondary manufacturing processes, such as injection molding. Again for example, dimension 728 and dimension 734 are selectively adjusted in accordance with desired assembly parameters including proper mounting in an assembly.

Accordingly, the scalable dimensions illustrated in FIG. 7 provide for improved scalability and versatility of expanded metal for various applications. Further, the ability to scale the dimensions shown in FIG. 7 provides for the adjustment of the overall size and shape the expanded metal sheet with unified solid margins in accordance with downstream processes including injection molding, mounting, assembly, and others.

Figure 7A:
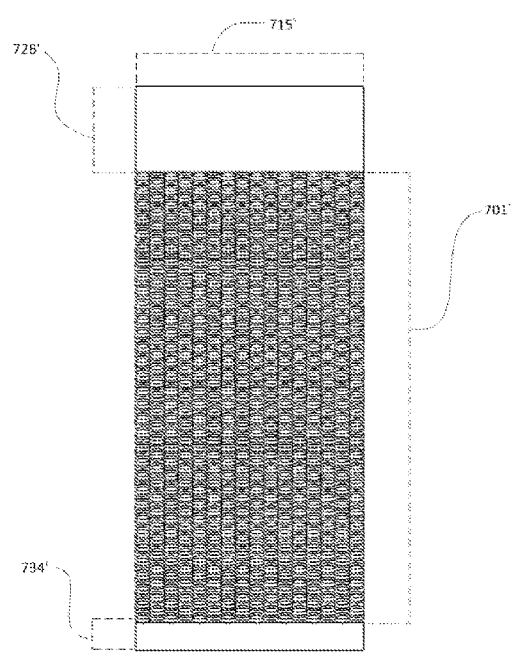
FIG. 7A is a plan view of an expanded metal sheet with unified solid margins having adjusted dimensions, according to multiple embodiments and alternatives.

Referring now to FIG. 7a, an expanded metal sheet with unified solid margins is shown with scaled dimensions 701', 715', 728', and 734', which correspond to dimensions 701, 715, 728, and 734, respectively, of FIG. 7.

Figure 8:
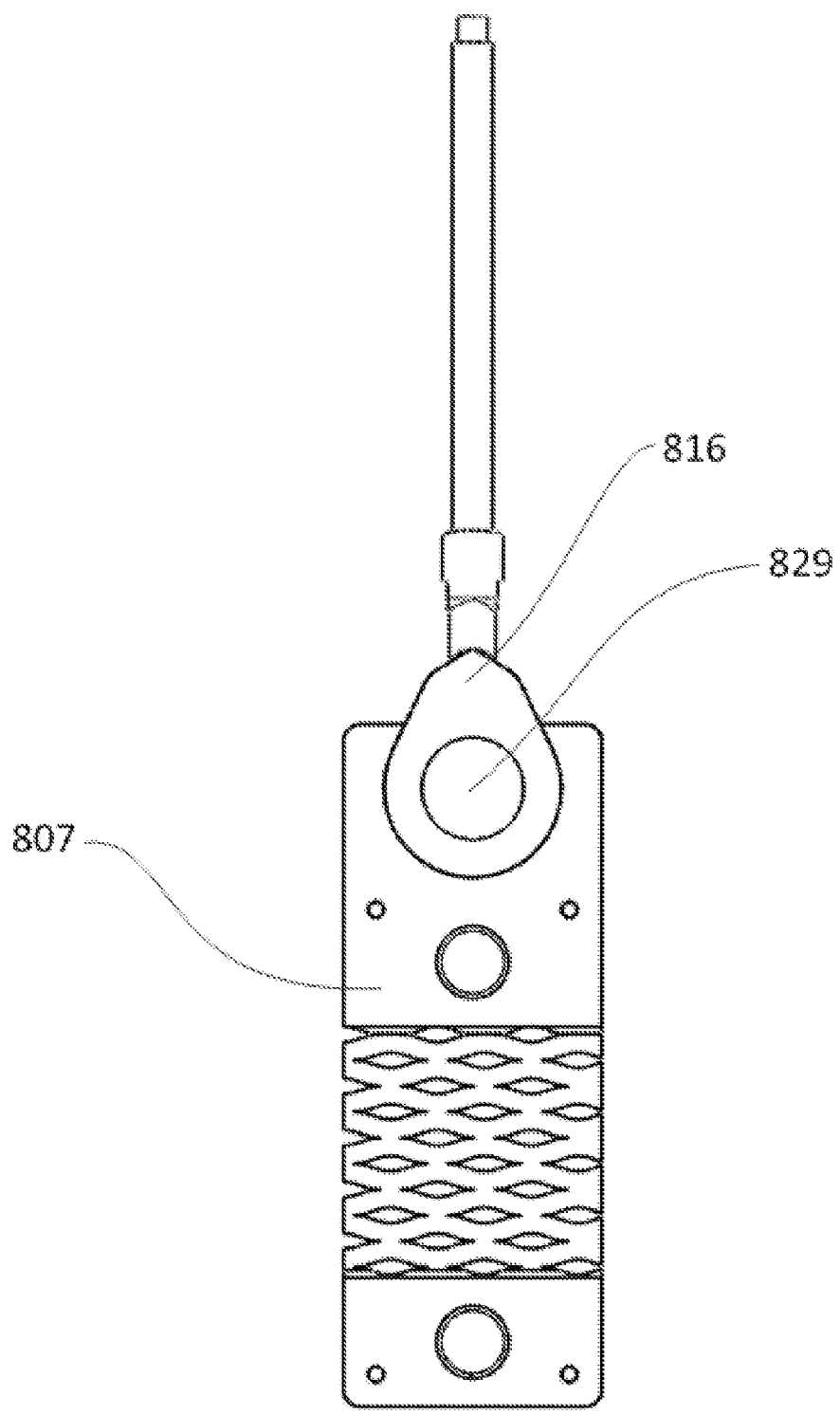
FIG. 8 is a plan view of an expanded metal sheet with unified solid margins further having an electrical connection attached to a solid margin, according to multiple embodiments and alternatives.

FIG. 8 shows an expanded metal sheet with unified solid margins 807 having an electrical connector 816 mechanically fixed to a solid margin 807 such that the electrical connector 816 and the expanded metal sheet with unified solid margins 807 are electrically coupled. Examples of electrical connectors 816 include, but are not limited to single as well as multiple connections strategically located to control and manipulate desired electrical properties for desired applications. Accordingly, the electrical connector 816 has an associated connector 829 joining it to the solid margin 807 of the expanded metal sheet. In some embodiments, the joining method 829 of the electrical connector 816 to the solid margin 807 includes, for example, riveted joint, welded joint, bolted joint, screw joint, knuckle joint, turnbuckle joint, cotter joint, revolute joint, and combinations thereof.

Often, in some embodiments, the electrical connector 816 and the associated site where it is joined to the solid margin 807 are insulated to protect from the ingress of liquids and prevent unwanted contact or exposure to corrosive environments. Commonly, the electrical connector 816, the joint 829, and some surrounding area of the solid margin 807 may be potted, whereby a solid, elastomeric, or gelatinous compound is used to fill in the area directly surrounding the desired components. Alternatively, electrical insulation may be provided through the process of injection molding by overmolding a specified geometry in a suitable material for electrically insulating the desired components. Consequently, overmolding may occur prior to or following the assembly of the electrical connector to the solid margin via joining methods such as: welding, brazing, bolting, screwing, riveting, and the like. Some suitable insulating materials may include thermoplastic, thermoset, Kapton, rubber-like polymers, such as fluoroelastomers, silicone, and combinations thereof. Examples of thermoplastics may include polyethylene (PE), cross-linked polyethylene, polypropylene, polyvinyl chloride (PVC), Teflon (polytetrafluoroethylene or PTFE), polyvinylidene difluoride (PVDF), thermoplastic elastomer (TPE), ethylene tetrafluoroethylene (ETFE), and others.

Figure 9:
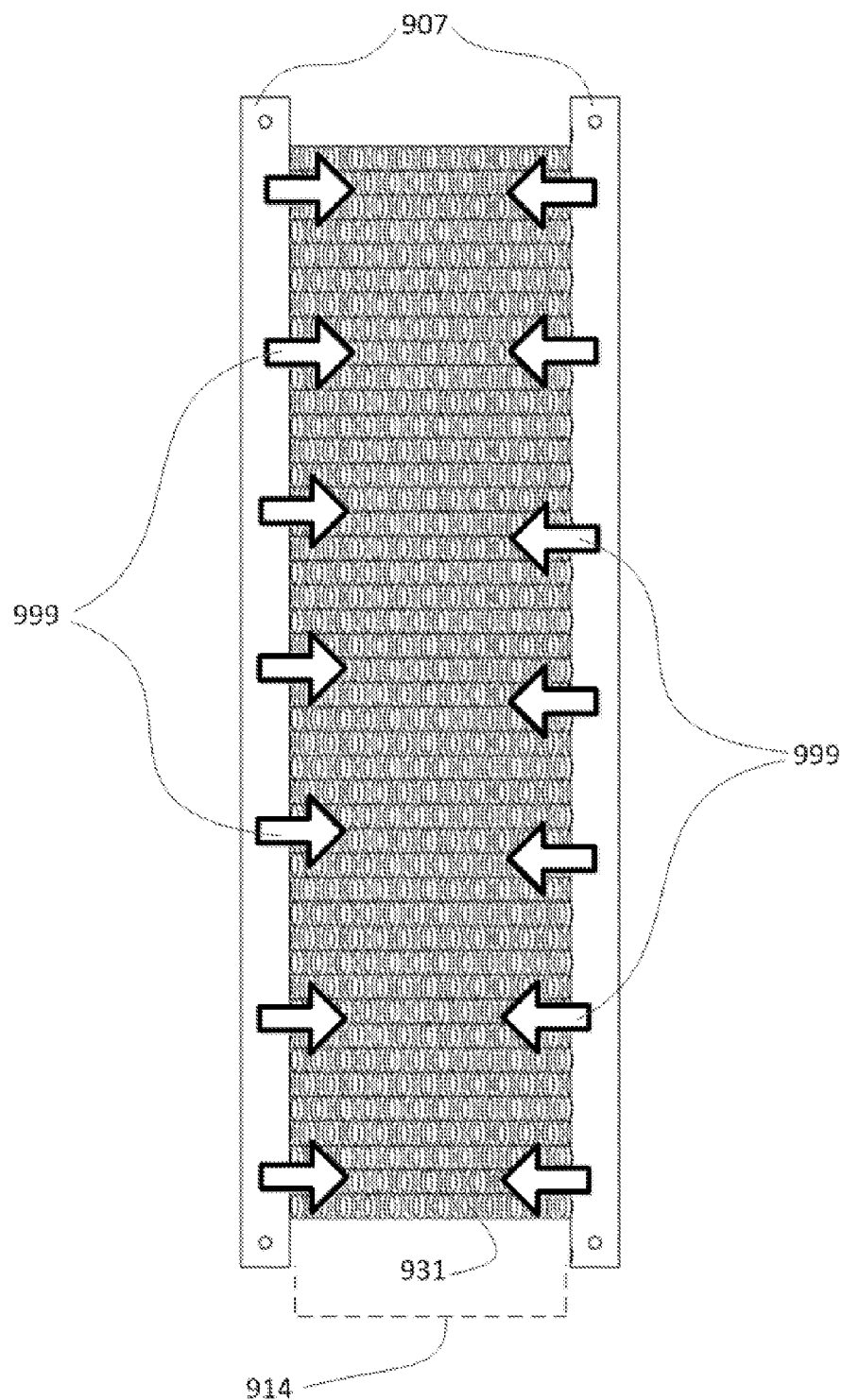
FIG. 9 is current distribution diagram showing the current distribution of the expanded metal sheet with unified solid margins, according to multiple embodiments and alternatives.

Referring now to FIG. 9, an expanded metal sheet with unified solid margins has an associated electrical current distribution that is representative of how electrical current 999 is distributed across the sheet after it is transferred from the electrical connector. FIG. 9 illustrates the electrical current transferring from the electrical connector that is attached to a power source to the solid margin 907 of the sheet. The electrical current 999 is distributed in a substantially uniform manner across the solid margin 907. The electrical current 999 is then distributed to the interconnected web 931 of the aperture region 914 in a substantially uniform manner. The substantially uniform manner of the electrical current distribution across the interconnected web 931 of the aperture region 914 is due to the uniform nature of the solid margin 907 and the aperture region 914. Electrical current 999 is uniformly transferred from the solid margin 907 to each adjacent section of the interconnected web 931, such that electrical current 999 is not entering the interconnected web 931 at a single contact point, as seen in the prior art. The uniform electrical current distribution across the interconnected web 931 reduces the presence of hot spots and "cold spots" created by uneven current distribution. In the case of the electrolytic chemical generator, hot spots lead to inefficient generation of chemicals, lack of control of chemical reactions, and corrosion and degradation of the coating and/or material of the expanded metal sheet. "Cold spots" lead to inefficient generations of desired products by creating underperforming zones due to deficient voltage and current density. Further in the case of the electrolytic chemical generator described in FIG. 4, the substantially uniform manner in which the electrical current 999 is distributed across the expanded metal sheet with unified solid margins improves the efficiency and precision of chemical generation as well as the control of the chemical generation process via the electrolytic cell. The unified solid margins 907 also provide advanced options for controlling electrolytic processes and chemistry via pulse shaping of energy inputs into the reactive zones of the electrodes.

Figure 10:
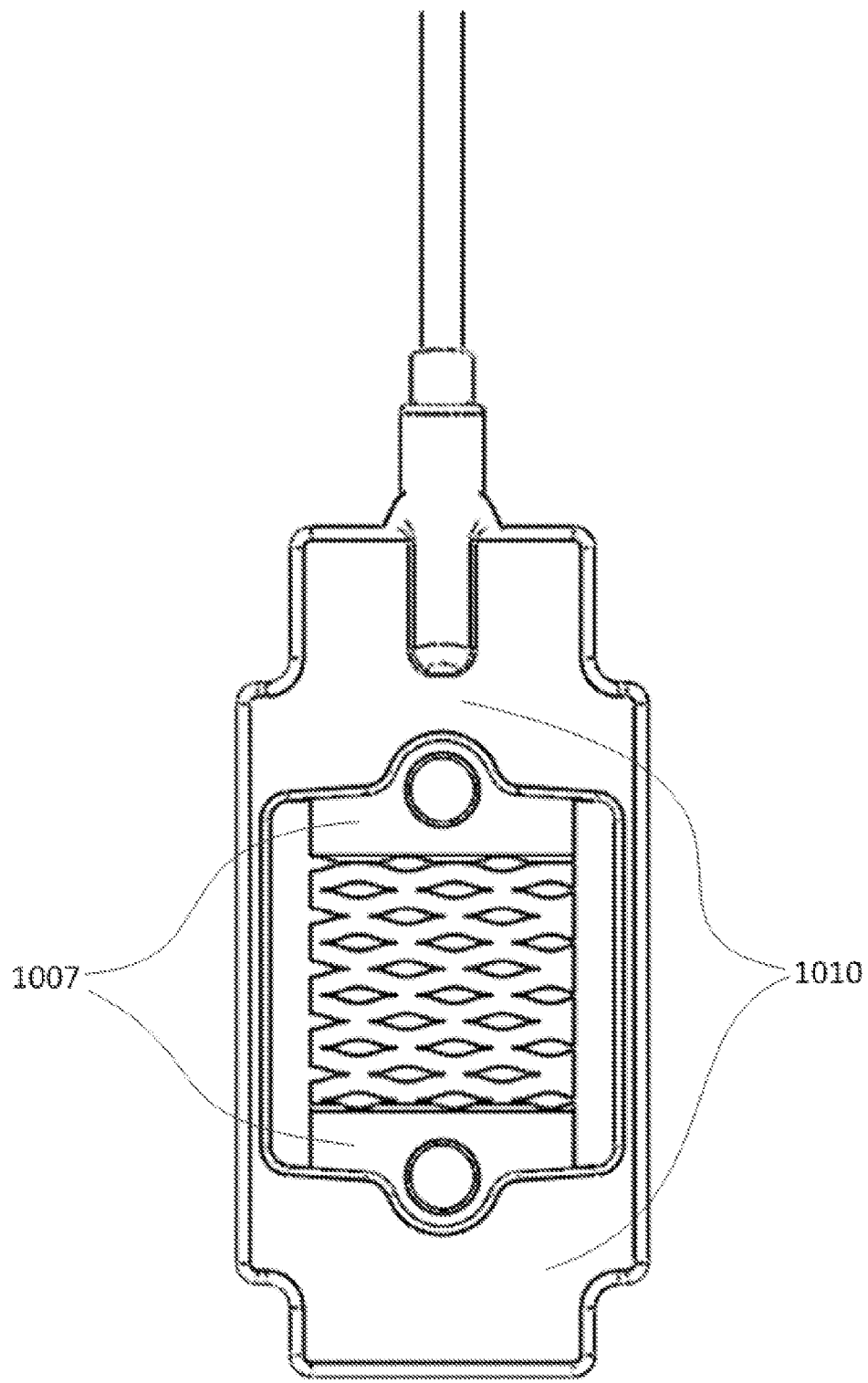
FIG. 10 is a plan view of an expanded metal sheet with mounting features, according to multiple embodiments and alternatives.

FIG. 10 shows a plan view of an electrode similar to the one illustrated in FIG. 4, wherein the electrode is comprised of an expanded metal sheet with unified solid margins 1007 having formed mounting features 1010. The mounting features 1010 provide for rapid assembly of an electrolytic cell. Sometimes, the mounting features 1010 eliminate the need for conventional fasteners to assemble the electrolytic cell. Some mounting features may include, for example, holes, notches, clip points, and other features capable of being formed from the solid margin 1007 of the sheet.

As shown in FIG. 10, the mounting feature 1010 is formed in solid margin of the sheet and, in an assembly, mates with a corresponding feature on either a housing, membrane, or both. Optionally, the mounting feature 1010 in the solid margin 1007 of the sheet has an associated fit with a corresponding feature. For example, the fit may include press fit, snap fit, slip fit, undercuts, fastener strategies, combinations thereof, and others.

Accordingly, FIG. 10 illustrates mounting features 1010 formed on the solid margin 1007 of the sheet via the process of injection overmolding. In this embodiment, the desired geometry to provide the desired fit with corresponding components is formed from an injection moldable material and bonded to the solid margin 1007. Such methods may involve strategic opening placement in the solid margins 1007 such as to accommodate "self-riveting" attachments during the overmolding process. A further formation of mounting features may include gasketing seals.

Consequently, the introduction of mounting features on the solid margins of the expanded metal sheet provides assembly and labor benefits beyond just the electrolytic cell. Further applications and assemblies utilizing expanded metal benefit from the mounting features being formed directly on the solid margin of the expanded metal sheet.

It will be understood that the embodiments described herein are not limited in their application to the specific details of the teachings and descriptions set forth, or as illustrated in the accompanying figures. Rather, it will be understood that the present embodiments and alternatives, as described and claimed herein, are capable of being practiced or carried out in various ways. The foregoing descriptions of several embodiments and alternatives are meant to illustrate, rather than to serve as limits on the scope of what has been disclosed herein. It will be understood by those having ordinary skill in the art that modifications and variations of these embodiments are reasonably possible in light of the above teachings and descriptions. Accordingly, the words and phrases used herein are for the purpose of description and should not be regarded as limiting. The use herein of "including," "comprising," "e.g.," "containing," or "having" and variations of those words is not meant to limit the scope of the embodiments, but rather is meant to encompass the items listed thereafter, and equivalents of those, as well as additional items.

What is claimed is:

1. An electrolytic system for treating water, comprising:
   a water inlet;
   a water outlet;
   a water pump;
   a housing comprising at least one anode chamber in electrical communication with at least one anode, for separating a salt into its positive and negative ions through electrolysis, and at least one cathode chamber in electrical communication with at least one cathode;
   at least one membrane between the anode chamber and cathode chamber;
   a conduit for water to flow from the at least one anode chamber to the at least one cathode chamber;
   wherein the anode and the cathode is each formed from a metal part having both an apertured region of voids formed in the metal and positioned in one or more rows and a region comprising a solid margin of undeformed metal positioned only around the edge of the metal part; and
   further comprising at least one electrical connector mechanically fixed to a solid margin of at least one of the anode and cathode.

2. The system of claim 1, further comprising an electrode-chamber-separating element located between the anode and the cathode for limiting the movement of ions across the at least one membrane.

3. The system of claim 2, wherein the electrode-chamber-separating element is formed from a metal part having both an apertured region of voids formed in the metal and positioned in one or more rows and a region comprising a solid margin of undeformed metal.

4. The system of claim 1, further comprising an electrically conductive material in the anode chamber through which electricity is conducted.

5. The system of claim 1, further comprising a gas release valve in communication with the conduit for releasing gaseous matter from the anode chamber into the conduit.

6. The system of claim 1, wherein an anode is positioned between a first cathode and a second cathode.

7. The system of claim 6, wherein the anode comprises a first anode surface and an opposing, second anode surface, the first anode surface being oriented primarily toward the first cathode, and the second anode surface being oriented primarily toward the second cathode.

* * * * *